UNITED STATES PATENT OFFICE.

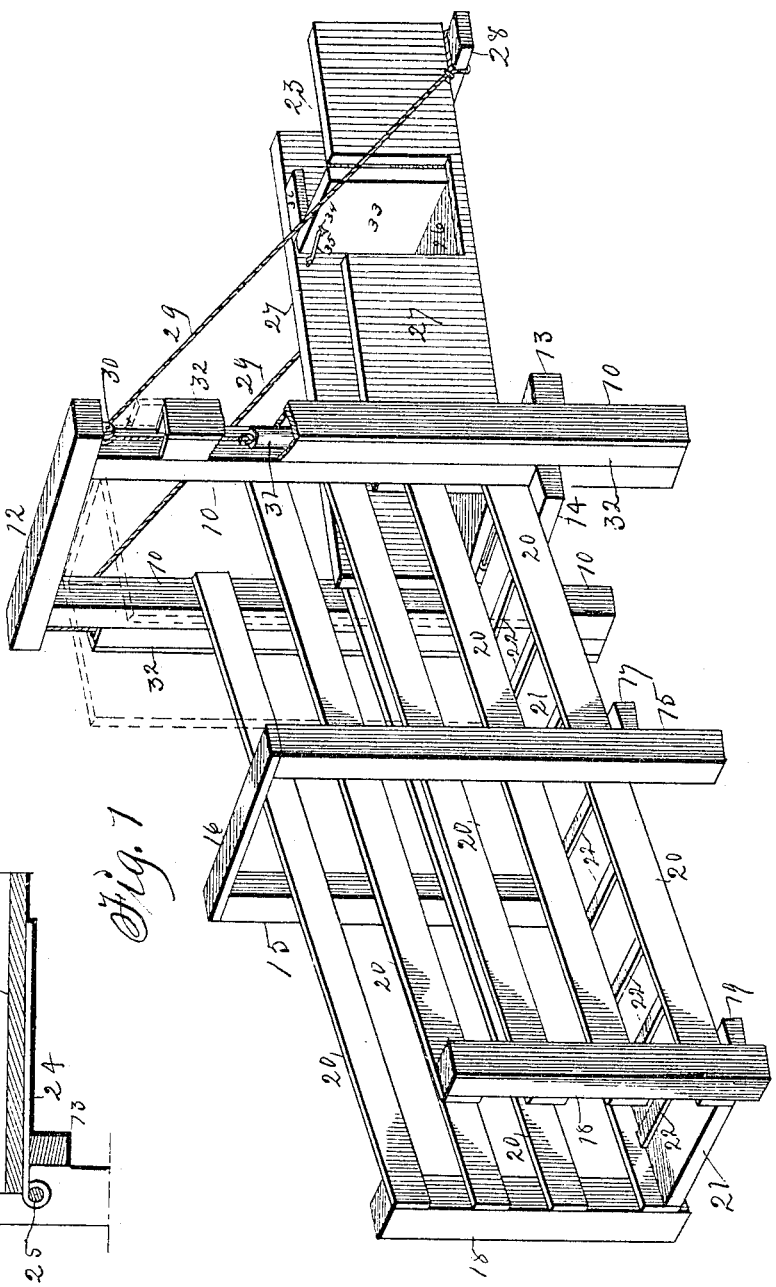

AARON E. STARRETT, OF KELLOGG, IOWA.

ADJUSTABLE STOCK-CHUTE.

No. 818,571.   Specification of Letters Patent.   Patented April 24, 1906.

Application filed November 20, 1905. Serial No. 288,774.

*To all whom it may concern:*

Be it known that I, AARON E. STARRETT, a citizen of the United States, residing at Kellogg, in the county of Jasper and State of Iowa, have invented a new and useful Adjustable Stock-Chute, of which the following is a specification.

My object is to provide an improved, simple, strong, and convenient stock-chute adapted to be placed in position relative to an open door in a building or an open gateway or panel of fence in a yard or field and also adapted to be detachably connected with a wagon-box or railway stock-car, as required to allow animals to be transferred to and from wagons and cars without lifting them.

My invention consists in the structure hereinafter set forth, pointed out in my claims, and illustrated in the accompanying drawings, in which—

Figure 1 is a perspective view that shows the construction, arrangement, and combination of all the parts, and dotted lines show the position into which the adjustable portion of the structure may be placed. Fig. 2 is a sectional detail view that shows the manner in which the adjustable part is connected with the fixed uprights at the rear end of the inclined bottom of the chute.

The numerals 10 designate mating wooden uprights rigidly connected at their tops by a cross-piece 12 and at their lower end portions by cross-pieces 13 and 14. Shorter uprights 15 are also rigidly connected at their tops by a cross-piece 16 and at their lower end portions by a cross-piece 17. A third pair of uprights 18 are rigidly connected at their lower ends by a cross-piece 19, and to all the uprights boards 20 are fixed to their inside faces, and on top of the cross-pieces at the lower end portions of the uprights is fixed a floor 21, and on top of the floor are fixed cleats 22 to produce an inclined plane and passage-way for animals closed at its sides and open at its ends.

At the top of the inclined floor and between the uprights 10 is hinged the extension 23 of the chute by means of hinge-irons 24 and a round bar 25, as shown in Fig. 2, or in any suitable way in such a manner as required to allow the hinged extension to be folded into an upright position, as indicated by dotted lines in Fig. 1. The hinged extension consists of a floor 26 and parallel sides 27, fixed to the floor.

A cross-piece 28 is fixed under the free end of the floor, and ropes 29 fixed to its ends and extended over direction-pulleys 30 at the tops of the uprights 10, and weights 31 attached thereto to aid by force of gravity manual force applied in lifting the extension 23 into an upright position and to retain it there until manual force is applied to lower it into a horizontal position, as required to be connected with and supported upon a wagon-box or a car. Boxes 32 are fixed to the uprights 10 to conceal and protect the weights 31.

A doorway is formed in one of the sides 27 of the extension, and a door 33 hinged thereto, and a staple 34 fixed to the door to be engaged by a latch 35, connected with the side 27, as required to retain the door in the position shown. A stop 36, fixed to the side 27, aids in retaining the door in a fixed position between the parallel sides 27, as required to direct animals in passing in and out of the extension in going into and from a wagon or car.

In the practical use of my invention when the extension 23 is in an upright position a wagon can be placed in position in such a manner that the extension can be lowered to rest on the wagon-box and to allow animals to pass through the chute and the doorway in the side of the chute and to or from the wagon, and when one wagon is loaded or unloaded the extension can be raised into upright position to close the upper end of the inclined passage-way until a second wagon is in proper position to lower the extension and connect it with the wagon.

Having thus set forth the purpose of my invention and its construction, its practical operation and utility will be readily understood by farmers and others familiar with the art to which it belongs.

What I claim as new, and desire to secure by Letters Patent, is—

1. In a stock-chute, an open-ended inclined passage-way having parallel sides for animals and an extension passage-way hinged to the upper end of the inclined passage and a hinged door in one of its parallel sides, to operate as set forth.

2. In a stock-chute, an open-ended inclined passage-way for animals and an extension passage-way hinged to the upper end of the inclined passage, a door in one of its sides, ropes connected with the free end of the extension and passed over direction-pulleys, direction-pulleys at the sides and tops of uprights, uprights at the rear end of the inclined passage and weights on the ends of the ropes, to operate in the manner stated.

3. In a stock-chute, an open-ended inclined passage-way for animals and an extension passage-way hinged to the upper end of the inclined passage, a door and door-fastening devices in one of its sides, ropes connected with the free end of the extension and passed over direction-pulleys, direction-pulleys at the sides and tops of uprights, uprights at the rear end of the inclined passage, weights on the ends of the ropes and boxing fixed to said uprights to conceal and protect the weights, arranged and combined to operate as set forth.

4. A stock-chute comprising an open-ended inclined passage-way for animals, an extension passage-way hinged to the upper end of the inclined passage, a door in one of its sides, door-fastening devices, ropes connected with the free end of the extension and passed over direction-pulleys, direction-pulleys at the sides and tops of the uprights, uprights at the rear end of the inclined passage, weights on the end of the ropes and boxing fixed to the uprights at the rear end of the inclined passage-way to conceal the weights, arranged and combined to operate in the manner stated.

AARON E. STARRETT.

Witnesses:
S. B. POWERS,
S. N. BELLAMY.